(12) United States Patent
Johnson

(10) Patent No.: US 7,176,378 B1
(45) Date of Patent: Feb. 13, 2007

(54) TEMPORARY ATTACHMENT APPARATUS FOR AN ELECTRICAL BOX

(75) Inventor: Steven J. Johnson, Galien, MI (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/382,642

(22) Filed: May 10, 2006

(51) Int. Cl.
  *H01H 9/02* (2006.01)
(52) U.S. Cl. .................. 174/58; 174/50; 174/135; 248/205.1
(58) Field of Classification Search .............. 174/58, 174/135, 50; 248/205.1; 24/618; 220/3.9, 220/4.02
  See application file for complete search history.

(56) References Cited

U.S. PATENT DOCUMENTS

| | | | |
|---|---|---|---|
| 2,573,260 A | 10/1951 | Gorman | |
| 3,152,219 A | 10/1964 | Murray | |
| 3,733,657 A | 5/1973 | Lankton | |
| 3,905,570 A | 9/1975 | Nieuwveld | |
| 4,194,644 A * | 3/1980 | Narvaez | 220/3.3 |
| 4,263,472 A * | 4/1981 | Maheu | 174/51 |
| 4,806,895 A | 2/1989 | Petrow | |
| 4,903,851 A | 2/1990 | Slough | |
| 5,131,613 A | 7/1992 | Kamiya | |
| 5,279,420 A | 1/1994 | Rodgers | |
| 5,402,971 A | 4/1995 | Bower | |
| 5,463,799 A | 11/1995 | Graham | |
| 5,533,912 A | 7/1996 | Fillinger | |
| 5,665,938 A | 9/1997 | Boshear | |
| 5,673,829 A | 10/1997 | Hartshorn | |
| 5,810,459 A * | 9/1998 | Barrett et al. | 312/111 |
| 5,906,465 A | 5/1999 | Sato | |
| 6,066,805 A | 5/2000 | Bordwell | |
| 6,240,606 B1 | 6/2001 | Hiroki | |
| 6,347,435 B1 | 2/2002 | Davignon | |
| 6,449,808 B1 | 9/2002 | Zappa | |
| 6,536,718 B2 | 3/2003 | Benito-Navazo | |
| 6,631,237 B2 | 10/2003 | Knudsen | |
| 6,880,787 B2 | 4/2005 | Stephen | |
| 6,886,893 B1 * | 5/2005 | Fisch et al. | 301/111.01 |
| 6,940,017 B2 * | 9/2005 | Roesch et al. | 174/58 |
| 7,053,301 B2 * | 5/2006 | Johnson | 174/58 |

FOREIGN PATENT DOCUMENTS

JP 06275962 9/1994

* cited by examiner

*Primary Examiner*—Dhiru R. Patel
(74) *Attorney, Agent, or Firm*—Roylance, Abrams, Berdo & Goodman, L.L.P.; Alfred N. Goodman

(57) ABSTRACT

An accessory attachment apparatus temporarily attaches an accessory to an electrical box with which the accessory is to be used. The accessory attachment apparatus includes an accessory adapted to be received by the electrical box. A stem, which has first and second ends, extends outwardly from the accessory. The first end of the stem is connected to the accessory. A spacer member is connected to the second end of the stem. The spacer member has a groove adapted to receive an edge of a wall of the electrical box to secure the accessory to the electrical box.

20 Claims, 4 Drawing Sheets

TEMPORARY ATTACHMENT APPARATUS FOR AN ELECTRICAL BOX

FIELD OF THE INVENTION

The present invention relates to an attachment apparatus for temporarily attaching an accessory to an electrical box with which the accessory is to be used. More particularly, the present invention relates to a temporary attachment apparatus that is secured to the electrical box during formation of the electrical box. Still more particularly, the present invention relates to a method of temporarily securing an attachment apparatus to an electrical box. The temporary attachment apparatus is secured to the electrical box during formation of the electrical box to prevent accidental removal of the accessory connected to the attachment apparatus prior to the intended use of the accessory with the electrical box.

BACKGROUND OF THE INVENTION

Structures often require accessory components to provide additional benefits or features to a user. For example, electrical boxes require non-metallic cable connectors to facilitate reception of cables, wires and the like by the electrical box. The cable connector is received by an opening in the electrical box. The cable connector has an opening adapted to securely receive cables therethrough. Cables are then passed through the cable connector and into the interior of the electrical box. Other accessories, such as wall supports to stabilize electrical boxes, are available to enhance usage of the electrical box by users.

One problem facing installation of accessories with electrical boxes is loss of the accessory during shipment and installation. Installers have difficulties keeping needed accessories with electrical boxes. During large construction projects in which numerous electrical boxes are installed, much time is lost by installers having to find accessories to be attached to the electrical boxes as they are installed. This provides for inefficient and costly electrical box installation. A need exists for an apparatus for temporarily attaching an accessory to an electrical box with which the accessory is to be used.

Another problem facing installers is matching desired accessories with designated electrical boxes. Electrical boxes and accessories are ordered separately and it is an inefficient and time consuming endeavor for an installer to match the accessories with the electrical boxes. A need exists for temporarily attaching an accessory to a structure with which the accessory is to be used so that the structure can be shipped with the accessory temporarily attached.

This problem is further complicated when installers take accessories from the existing inventory to replace accessories that have been lost, thereby creating a shortage of accessories. This results in delayed installation as additional accessories must be ordered to replenish the depleted inventory. A need exists for an apparatus for temporarily attaching an accessory to a structure with which the accessory is to be used to prevent loss of the accessory.

Existing temporary attachment devices have been used to attach accessories to electrical boxes. However, such temporary attachment devices are prone to breaking or becoming disengaged from the electrical box, such that the accessory and electrical box are separated, thereby defeating the purpose of the temporary attachment device. Thus, a need exists for a temporary attachment apparatus that more securely connects the accessory to the electrical box.

Examples of existing fastening devices are disclosed in the following references: U.S. Pat. No. Re. 34,786 to Slough; U.S. Patent Application Publication No. 2005/0205283 A1 to Johnson; and Japanese Patent Publication No. 06275962 to Atsushi.

Thus, there is a continuing need to provide an improved temporary attachment apparatus for securing an accessory to an electrical box with which the accessory is to be used.

SUMMARY OF THE INVENTION

Accordingly, a primary objective of the present invention is to provide an improved temporary attachment apparatus for securing an accessory to an electrical box with which the accessory is to be used.

A further objective of the present invention is to provide an improved temporary attachment apparatus that secures an accessory to an electrical box during formation of the electrical box.

A still further objective of the present invention is to provide a method of temporarily attaching an accessory to an electrical box with which the accessory is to be used during formation of the electrical box.

An accessory attachment apparatus is provided for temporarily attaching an accessory to an electrical box with which the accessory is to be used. The accessory attachment apparatus includes an accessory adapted to be received by the electrical box. A stem, which has first and second ends, extends outwardly from the accessory. The first end of the stem is connected to the accessory. A spacer member is connected to the second end of the stem. The spacer member has a groove adapted to receive an edge of a wall of the electrical box to secure the accessory to the electrical box.

A method of temporarily securing a non-metallic accessory to an electrical box is provided. A spacer member of an accessory attachment apparatus is positioned proximal an edge of a base of the electrical box. An edge of a side wall of the electrical box is inserted in a groove in the spacer member. The side wall is fastened to the base of the electrical box to secure the accessory attachment apparatus to the electrical box.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

Referring now to the drawings that form a part of the original disclosure.

Throughout the drawings, like reference numerals will be understood to refer to like parts, components and structures.

DETAILED DESCRIPTION OF EXEMPLARY EMBODIMENTS

Figure 1:
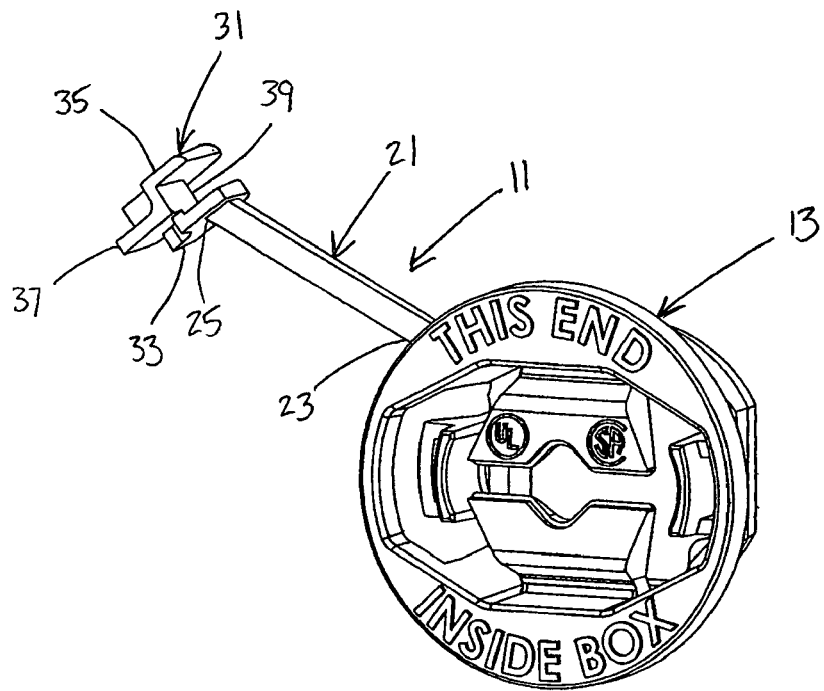
FIG. 1 is a perspective view of a temporary attachment apparatus according to an exemplary embodiment of the present invention.

As shown in FIGS. 1–10, the present invention relates to an apparatus 11 for temporarily attaching an accessory 13 to a structure, such as an electrical box 15, with which the accessory is to be used. The accessory attachment apparatus 11 includes an accessory 13 adapted to be received by the electrical box 15. A stem 21 having a first end 23 and a second end 25 extends outwardly from the accessory 13. The first end 23 of the stem 21 is connected to the accessory 13. A spacer member 31 is connected to the second end 25 of the stem 21. The spacer member 31 has a groove 39 adapted to receive a wall 41 of the electrical box 15 to secure the accessory to the electrical box.

Figure 9:
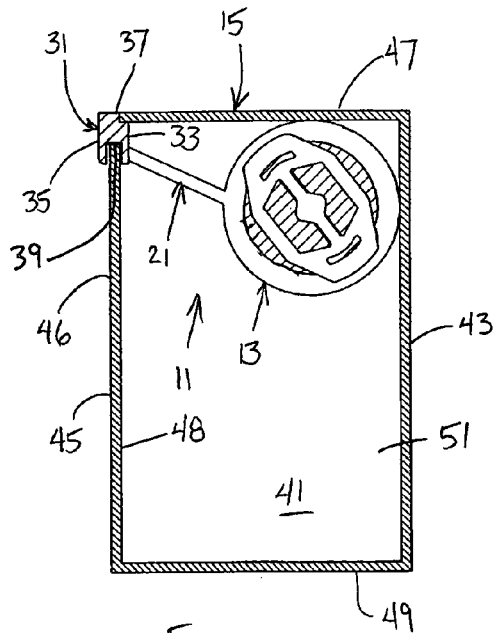
FIG. 9 is a front elevational view in cross section taken along line 9—9 of FIG. 8 of the temporary attachment apparatus secured to the assembled electrical box.
Figure 10:
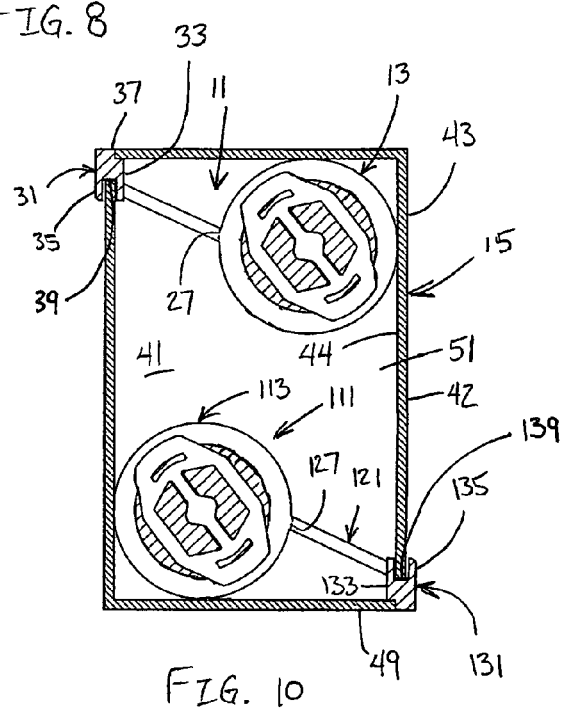
FIG. 10 is a front elevational view in cross section similar to FIG. 9 in which a second temporary attachment apparatus is secured to the assembled electrical box.

The accessory attachment apparatus 11 includes a stem 21 connecting the accessory 13 to the spacer member 31, as shown in FIGS. 1–4 and 9–10. The stem 21 has a first end 23 that is connected to the accessory 13 and a second end 25 that is connected to the spacer member 31. The stem 21 extends outwardly from the accessory 13. The stem may have a score line 27, as shown in FIG. 10, to facilitate removing the accessory 13 from the stem 21 when the accessory is to be used with the electrical box.

Figure 2:
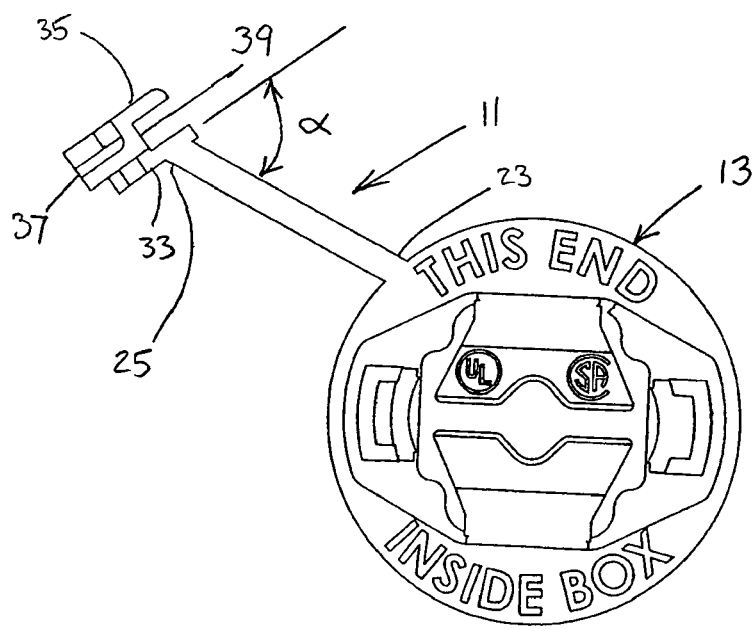
FIG. 2 is a rear elevational view of the temporary attachment apparatus of FIG. 1.
Figure 3:
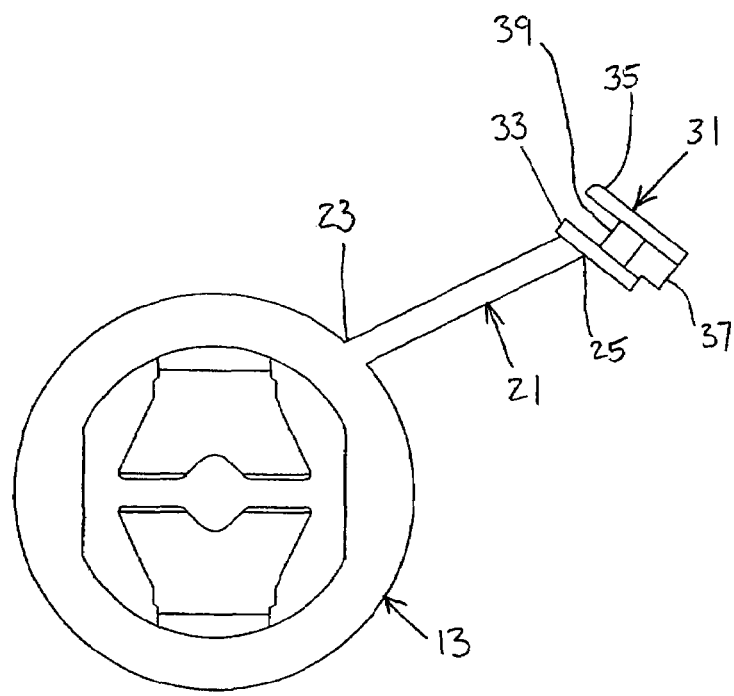
FIG. 3 is a front elevational view of the temporary attachment apparatus of FIG. 1.
Figure 4:
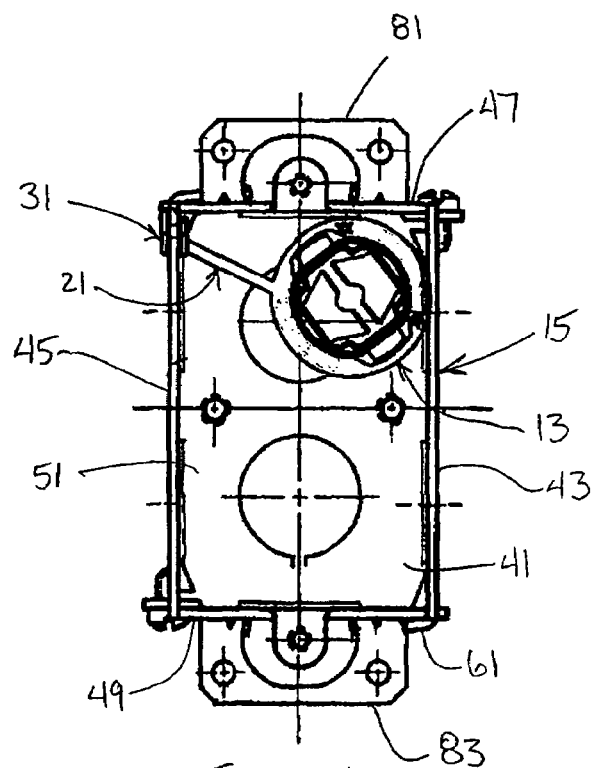
FIG. 4 is a front elevational view of an assembled electrical box to which a temporary attachment apparatus has been secured.
Figure 5:
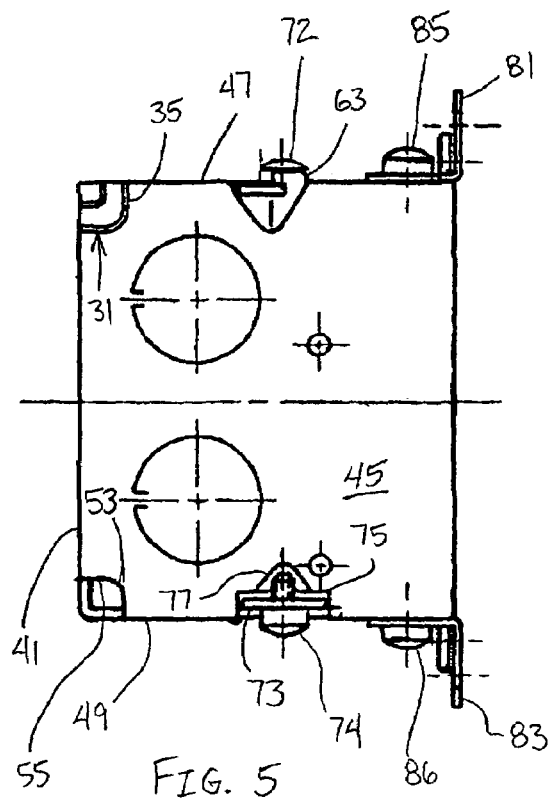
FIG. 5 is a left side elevational view of the assembled electrical box of FIG. 4.
Figure 6:
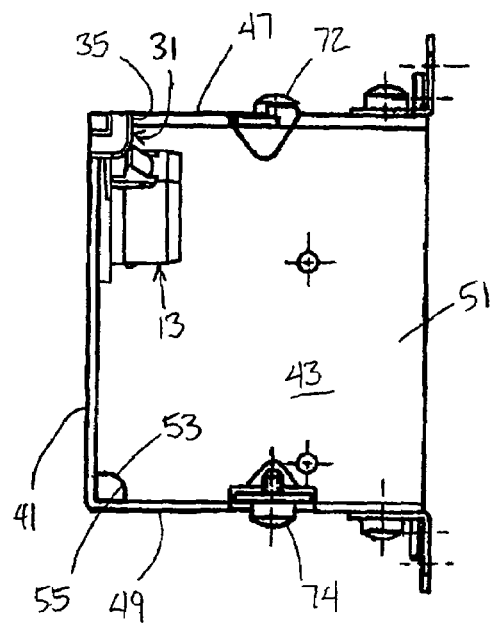
FIG. 6 is a left side elevational view of the assembled electrical box of FIG. 5 with a left side wall of the electrical box removed.

The spacer member 31 secures the accessory 13 to the electrical box 15, as shown in FIGS. 4–10. The spacer member 31 is secured to the second end 25 of the stem 21, as shown in FIGS. 1–3. The spacer member 31 has a first wall 33 and a second wall 35 connected by a connecting portion 37, which is recessed from an outer edge of the first and second walls, as shown in FIGS. 1–3. A groove 39 is formed between the first and second walls 33 and 35 and the connecting portion 37. Preferably, the groove 39 is substantially arcuate and extends over approximately ninety degree, as shown in FIGS. 5 and 6. Preferably, an angle α between the spacer member 31 and the stem 21 is approximately 65 degrees or preferably approximately 64.9 degrees, as shown in FIG. 2.

A score line 27, as shown in FIG. 10, may be made in the stem 21 to provide for easy separation of the accessory 13 from the stem 21, thereby frangibly and removably coupling the accessory to the accessory attachment apparatus 11. Any other suitable means of detachment may be used instead of a score line, such as weakening the stem at the desired point of separation. Alternatively, the stem 21 may be simply cut with scissors or shears to separate the accessory 13 from the stem.

The accessory 13 may be any accessory suitable for use with the support 15 to which the accessory is attached. The accessory 13 shown in FIGS. 1–3 and 8–10 is a cable connector for use with an electrical box 15. Alternatively, any suitable accessory may be attached to the stem 21, such as a box support for stabilizing the electrical box or a fastener retainer. Suitable accessories are disclosed in co-pending patent application Ser. No. 10/805,488, filed Mar. 22, 2004 and Ser. No. 10/887,452, filed Jul. 9, 2004, the entire disclosures of both of which are hereby incorporated by reference.

The electrical box 15 has a base 41, as shown in FIGS. 4–10. A first side wall 43, a second side wall 45, a top wall 47 and a bottom wall 49 extend outwardly from the base 41. Preferably, the base 41 and the top and bottom walls 47 and 49 are unitarily formed. First and second side walls 43 and 45 are preferably removably connected to the base 41 and the top and bottom walls 47 and 49. The base 41, first and second side walls 43 and 45, and the top and bottom walls 47 and 49 define a cavity 51.

As shown in FIG. 5, cutout portions 53 are formed in the upper and lower rear corners of the first and second side walls 43 and 45. Each of the cutout portions 53 in the first and second side walls 43 and 45 has an edge 55 that is adapted to be received by the groove 39 of the spacer member 31. The first side wall 43 has a first tab 61 and the second side wall has a second tab 63. The bottom wall 49 has a first recess (not shown) adapted to receive the first tab 61 of the first side wall 43. The top wall 47 has a second recess 64 adapted to receive the second tab 63 of the second side wall 45. Opposite edges of the top and bottom walls 47 and 49 have fastener tabs 71 and 73, respectively, adapted to receive fasteners 72 and 74 to facilitate retaining the first and second side walls 43 and 45. A recess 75 in the second side wall 45 is adapted to receive the second fastener tab 73, as shown in FIG. 5. A similar recess in the first side wall 43, which is not shown, is adapted to receive the first fastener tab 71. An indented portion 77 is formed on the outer surface of the second side wall 45 proximal the recess 75 to receive the fastener 74. A corresponding indented portion (which is not shown) is formed on the outer surface of the first side wall 43 proximal the fastener tab recess to receive the fastener 72. Preferably, the first and second side walls are substantially identical, and are mirror images upon assembly of the electrical box 15.

Mounting brackets 81 and 83 are secured by fasteners 85 and 86 to the top and bottom walls 47 and 49, respectively, as shown in FIGS. 4–7. Preferably, the mounting brackets 81 and 83 are substantially L-shaped, such that a first leg of the bracket is secured to the electrical box and the second leg of the bracket is adapted to receive an electrical device.

Preferably, the accessory 13, the stem 21 and the spacer member 31 are unitarily formed as one-piece by, for example, molding. Preferably, the attachment apparatus 11 is made of a non-metallic material, such as a polycarbonate.

Assembly and Disassembly

As shown in FIGS. 4–5 and 7–10, the electrical box is assembled. FIG. 6 shows the accessory attachment apparatus 111 positioned in the cavity 51 of the electrical box 15 prior to connecting the second side wall 45 to the electrical box.

The first tab 61 of the first side wall 43 is inserted in the recess in the bottom wall 49. The first side wall 43 is then pivoted such that the rear edge of the first side wall is substantially flush with the base 41 and such that the fastener tab 71 is received by the fastener tab recess in the first side wall. The fastener 72 is then inserted in a fastener hole in the fastener tab 71 and threaded downardly such that the fastener is received by the indented portion in the first side wall 43. The top edge of the first side wall 43 is substantially flush with the top wall 47 of the electrical box and the bottom edge is substantially flush with the bottom wall 49, thereby preventing the first side wall from moving further into the cavity 51 of the electrical box. The fastener 72 substantially prevents outward movement of the first side wall 43. The first tab being received in the recess in the bottom wall 49 further prevents outward movement of the first side wall 43.

Figure 8:
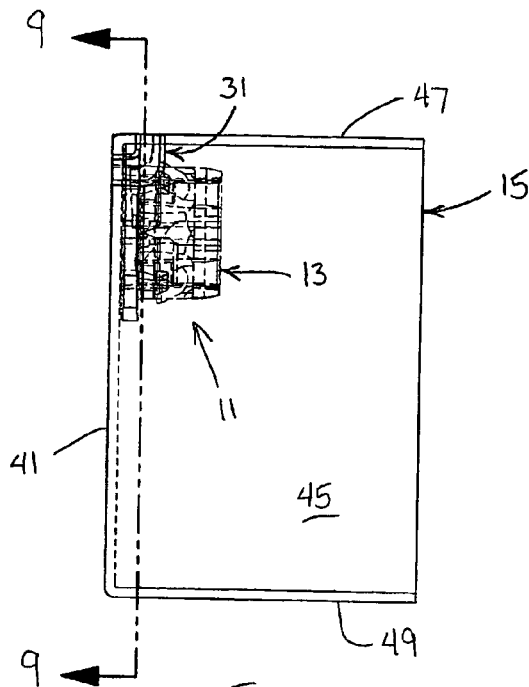
FIG. 8 is a left side elevational view in partial cross section of a temporary attachment apparatus secured to an assembled electrical box.

Installation of the second side wall 45 is substantially similar to installation of the first side wall 43. Prior to connecting the second side wall 45 to the electrical box 15, the temporary attachment apparatus 11 is disposed within the cavity 51 of the electrical box, as shown in FIG. 6. The first wall 33 of the spacer member 31 is positioned such that the first wall abuts the inner surface of the top wall 47 and the inner surface of the base 41, as shown in FIGS. 8 and 9. The connecting portion 37 abuts the outer edges of the base 41 and the top wall 47 to further facilitate positioning the temporary attachment apparatus 11.

Figure 7:
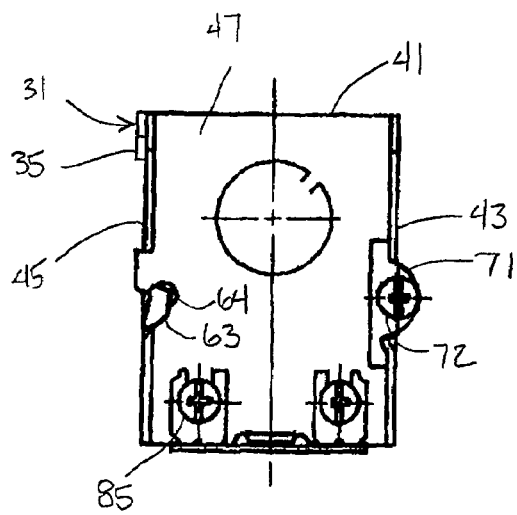
FIG. 7 is a top plan view of the assembled electrical box of FIG. 4.

The second side wall 45 is then installed in a manner substantially similar to the installation of the first side wall 43. The second tab 63 of the second side wall 45 is inserted in the recess 64 in the top wall 47, as shown in FIG. 7. The second side wall 45 is then pivoted such that the rear edge of the second side wall is substantially flush with the base 41 and such that the fastener tab 73 is received by the fastener tab recess 75 in the second side wall. Additionally, the outer edge 55 of the cutout portion 53 of the second side wall 45 proximal the top edge of the wall is received by the groove 39 of the spacer member 31. The second wall 35 of the spacer member 31 is disposed proximal an outer surface 46 of the second side wall 45 and the first wall 33 is disposed proximal an inner surface 48 of the second side wall, as shown in FIGS. 9 and 10. The first and second walls 33 and 35 of the spacer member 31 are larger than the cutout portion 53 such that the temporary attachment apparatus is not movable through the cutout portion. The temporary attachment apparatus 11 is secured to the electrical box 15, thereby preventing accidental removal or detachment of the temporary attachment apparatus from the electrical box.

The fastener 74 is then inserted in a fastener hole in the fastener tab 73 and threaded downwardly such that the fastener is received by the indented portion 77 in the second side wall 45. The top edge of the second side wall 45 is substantially flush with the top wall 47 of the electrical box and the bottom edge is substantially flush with the bottom wall 49, thereby preventing the first side wall from moving further into the cavity 51 of the electrical box. The fastener 74 substantially prevents outward movement of the second side wall 45. The second tab 63 being received in the recess 64 in the top wall 47 further prevents outward movement of the second side wall 45.

As shown in FIG. 10, a second temporary attachment apparatus 111 may be secured to the electrical box 15. The second temporary attachment apparatus 111 is substantially identical to the first temporary attachment apparatus 11. The second temporary attachment apparatus 111 is secured to the electrical box 15 in a matter substantially identical to the installation of the first temporary attachment apparatus 11, except that the second temporary attachment apparatus 111 is retained by the base 41, bottom wall 49 and first side wall 43. The groove 139 of the second spacer member 131 is received by the first side wall 43. Alternatively, the second attachment member 111 may receive an edge of the lower cutout portion in the second side wall 45.

The second accessory 113 is disposed within the cavity 51 of the electrical box. The first wall 133 of the second spacer member 131 is disposed proximal an inner surface 44 of the first side wall 43, and the second wall 135 is disposed proximal an outer surface 42 of the first side wall. A score line 127 may be provided to facilitate removing the second accessory 113 from the stem 121 of the second temporary attachment apparatus 111.

While advantageous embodiments have been chosen to illustrate the invention, it will be understood by those skilled in the art that various changes and modifications may be made therein without departing from the scope of the invention as defined in the appended claims.

What is claimed is:

1. An accessory attachment apparatus, comprising:
    an accessory adapted to be received by an electrical box;
    a stem having first and second ends and extending outwardly from said accessory, said first end of said stem being connected to said accessory; and
    a spacer member connected to said second end of said stem, said spacer member having a groove adapted to receive an edge of a wall of the electrical box to secure said accessory to the electrical box.

2. An accessory attachment apparatus according to claim 1, wherein
    said accessory is a non-metallic cable connector.

3. An accessory attachment apparatus according to claim 1, wherein
    said accessory, stem and spacer member are unitarily formed as one piece.

4. An accessory attachment apparatus according to claim 1, wherein
    said accessory, stem and spacer member are made of a non-metallic material.

5. An accessory attachment apparatus according to claim 1, wherein
    said spacer member has first and second wall members between which said groove is disposed.

6. An accessory attachment apparatus according to claim 5, wherein
    said first wall member of said spacer member is adapted to be disposed inside the electrical box and said second wall member is adapted to be disposed outside the electrical box.

7. An accessory attachment apparatus according to claim 1, wherein
    said stem is removable from said accessory proximal said first end of said stem.

8. An accessory attachment apparatus according to claim 1, wherein
    said stem has a score line to facilitate removal of said stem from said accessory.

9. An accessory attachment apparatus according to claim 1, wherein
    an angle between the second end of the stem and the spacer member is approximately sixty-five degrees.

10. An accessory attachment apparatus for an electrical box, comprising:
    an accessory adapted to be received by said electrical box;
    a stem having first and second ends extending outwardly from said accessory, said first end of said stem being connected to said accessory;
    a spacer member connected to said second end of said stem, said spacer member having a groove;
    an electrical box having a base and a side wall connected to said base, said side wall having an outer edge; and
    said groove of said spacer member receiving said outer edge of said side wall of said electrical box to secure said accessory to said electrical box.

11. An accessory attachment apparatus according to claim 10, wherein
    said accessory is a non-metallic cable connector.

12. An accessory attachment apparatus according to claim 10, wherein
said accessory, stem and spacer member are unitarily formed.

13. An accessory attachment apparatus according to claim 10, wherein
said accessory, stem and spacer member are made of a non-metallic material.

14. An accessory attachment apparatus according to claim 10, wherein
said spacer member has first and second wall members between which said groove is disposed.

15. An accessory attachment apparatus according to claim 14, wherein
said first wall member of said spacer member is disposed proximal an inner surface of said electrical box side wall and said second wall member is disposed proximal an outer surface of said side wall.

16. An accessory attachment apparatus according to claim 10, wherein
said stem is removable from said accessory proximal said first end of said stem.

17. An accessory attachment apparatus according to claim 10, wherein
said stem has a score line to facilitate removal of said stem from said accessory.

18. An accessory attachment apparatus according to claim 10, wherein
an angle between the second end of the stem and the spacer member is approximately sixty-five degrees.

19. A method of temporarily securing a non-metallic accessory to an electrical box, comprising the steps of
positioning a first spacer member of a first accessory attachment apparatus proximal a first edge of a base of the electrical box;
inserting a first edge of a first side wall of the electrical box in a first groove in the first spacer member; and
fastening the first side wall to the base of the electrical box to secure the first accessory attachment apparatus to the electrical box.

20. A method of temporarily securing a non-metallic accessory to an electrical box according to claim 19, further comprising
positioning a second spacer member of a second accessory attachment apparatus proximal a second edge of the base of the electrical box opposite the first edge of the base;
inserting a second edge of a second side wall of the electrical box in a second groove in the second spacer member; and
fastening the second side wall to the base of the electrical box to secure the second accessory attachment apparatus to the electrical box, the second side wall being opposite the first side wall.

* * * * *